United States Patent [19]
Kuo et al.

[11] Patent Number: 6,014,194
[45] Date of Patent: *Jan. 11, 2000

[54] FORMING POLYMER NETWORKS WITH RED, GREEN AND BLUE SUB-PIXELS BY APPLYING DIFFERENT BIAS VOLTAGES WHILE EXPOSED TO A UV LIGHT

[75] Inventors: Chen-Lung Kuo, Hsinchu; Chung-Kuang Wei; Yong-Hong Lu, both of Hsinchu Hsien, all of Taiwan

[73] Assignee: Industrial Technology Research Institute, Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/904,732

[22] Filed: Aug. 1, 1997

Related U.S. Application Data

[63] Continuation-in-part of application No. 08/904,732, Aug. 1, 1997.

[51] Int. Cl.$^7$ .................................................. G02F 1/1333
[52] U.S. Cl. .................................. 349/88; 349/86; 349/92
[58] Field of Search .................................. 349/88, 92, 93, 349/86, 94, 89

[56] References Cited

U.S. PATENT DOCUMENTS

| | | | |
|---|---|---|---|
| 5,680,233 | 10/1997 | Faris et al. | 349/86 |
| 5,709,911 | 1/1998 | Onishi et al. | 349/88 |
| 5,739,889 | 4/1998 | Yamada et al. | 349/181 |
| 5,790,218 | 8/1998 | Koden et al. | 349/92 |
| 5,798,057 | 8/1998 | Hikmet | 349/104 |
| 5,815,224 | 9/1998 | Hasegawa et al. | 349/58 |
| 5,818,615 | 10/1998 | Abileah et al. | 349/117 |
| 5,828,427 | 10/1998 | Faris | 349/86 |
| 5,847,798 | 12/1998 | Yang et al. | 349/88 |

*Primary Examiner*—William L. Sikes
*Assistant Examiner*—Heidi L. Eisenhut

[57] ABSTRACT

A liquid crystal display device comprises extended polymer networks formed in the liquid crystal cells. By adding a monomer and a photo-initiator into the liquid crystal material of a liquid crystal display, applying a bias voltage and exposing the display under a UV light, a polymer network can be formed. The polymer network modifies the electro-optical characteristic of a liquid crystal display device. With different bias voltages, polymer networks of different structures can be formed so that the color difference of the liquid crystal display with respect to red, green and blue light can be minimized. Liquid crystal display devices of fast switching response and low color dispersion can be fabricated.

13 Claims, 10 Drawing Sheets

Step 1.

Step 2.

Step 3.

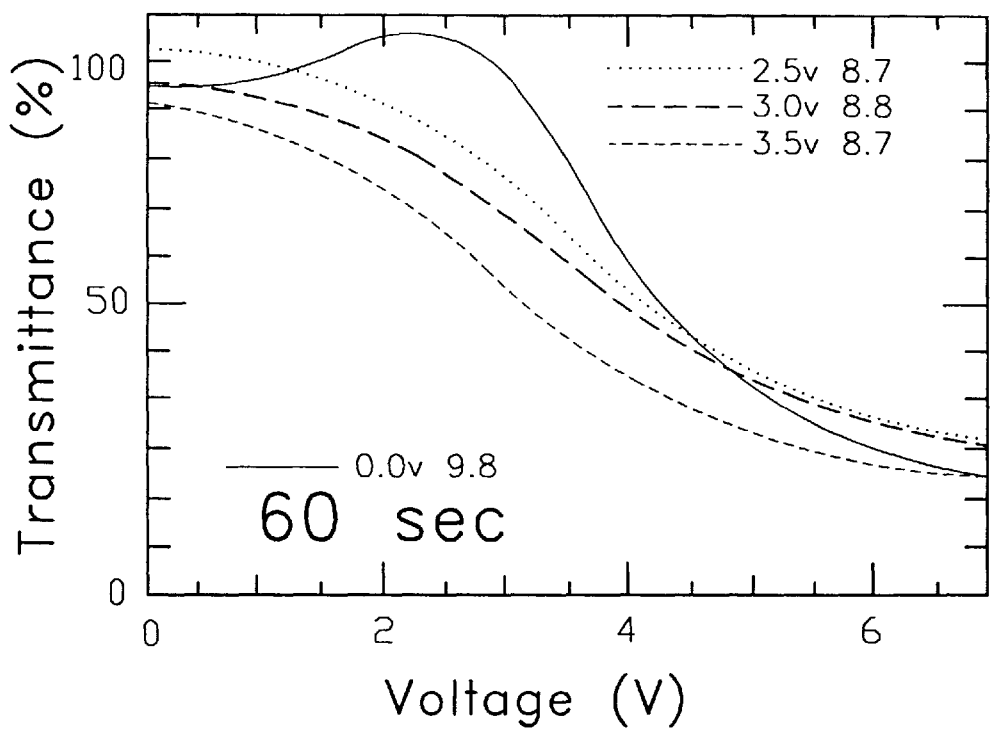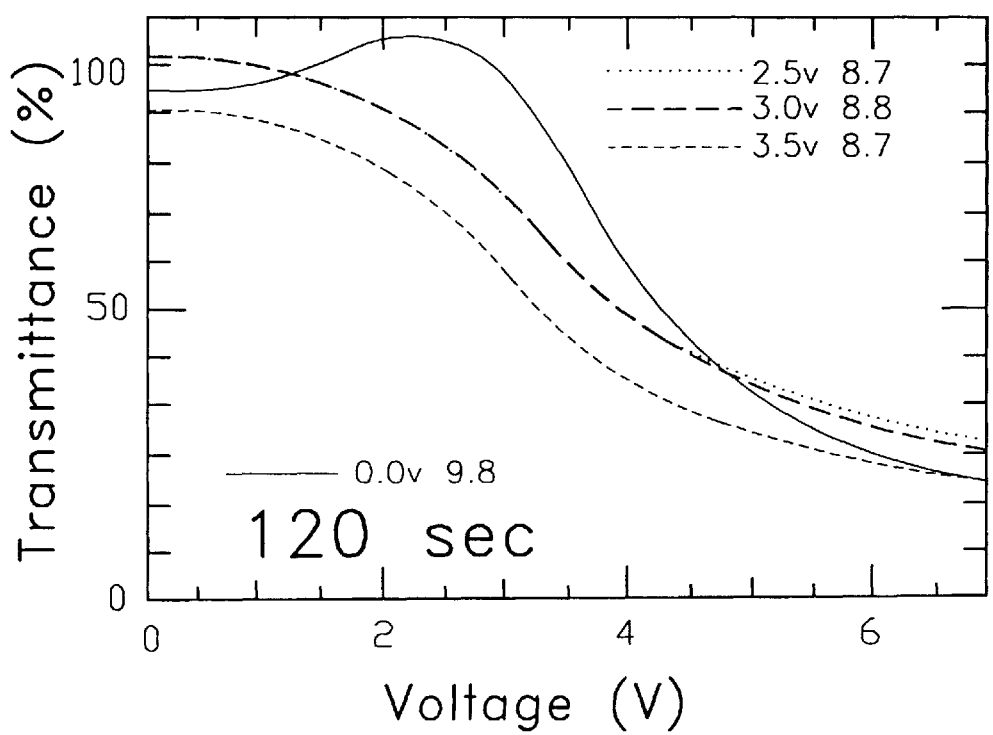
F I G. 3

Step 1.

Step 2.

Step 3.

Step 1.

Step 2.

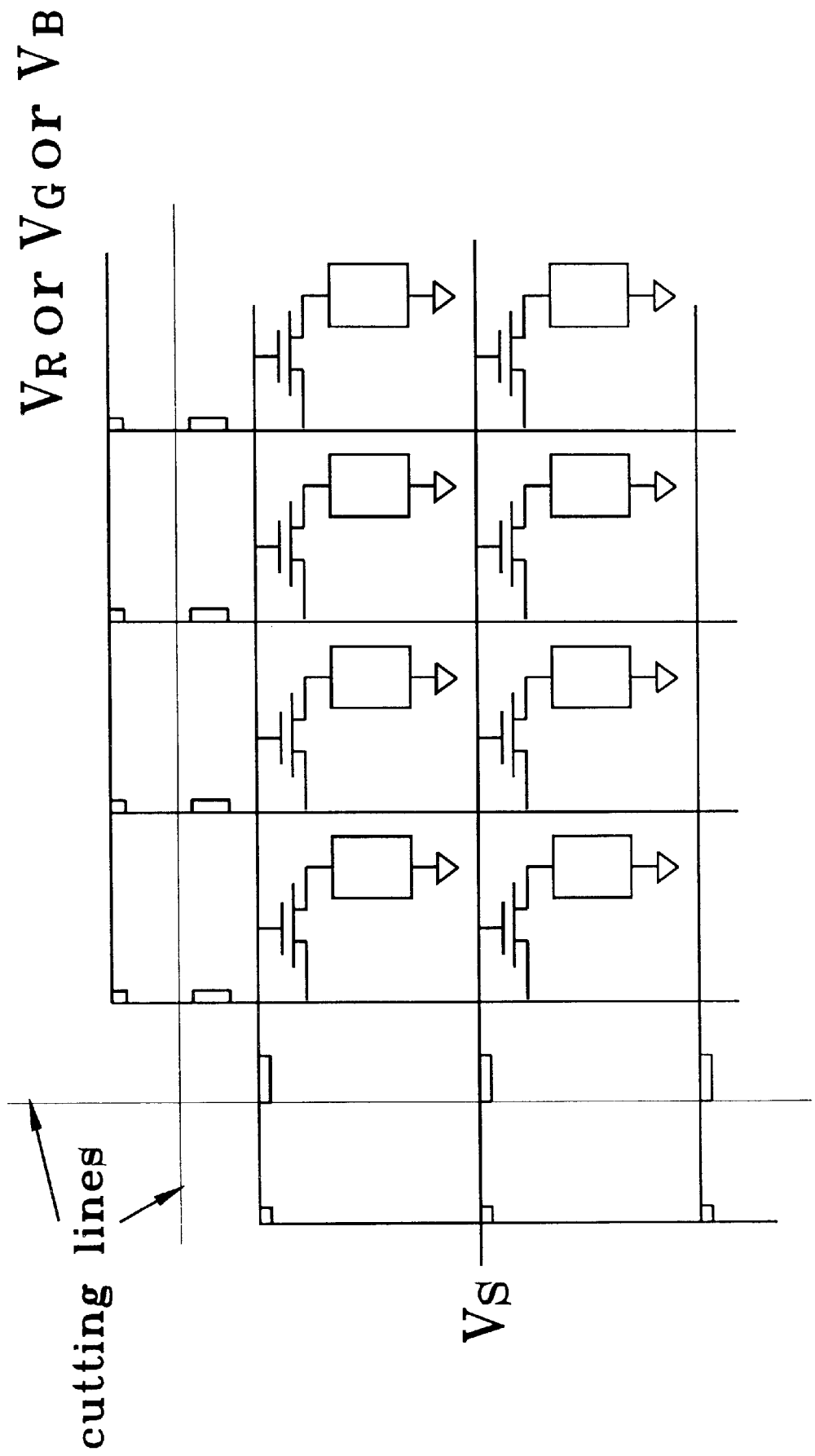
F I G. 8

FORMING POLYMER NETWORKS WITH RED, GREEN AND BLUE SUB-PIXELS BY APPLYING DIFFERENT BIAS VOLTAGES WHILE EXPOSED TO A UV LIGHT

This is a continuation-in-part of application Ser. No. 08/904,732, filed Aug. 1, 1997.

FIELD OF THE INVENTION

The present invention relates to a liquid crystal display device, and more specifically to the manufacture of a low color dispersion liquid crystal display.

BACKGROUND OF THE INVENTION

Liquid crystal display (LCD) devices are widely used in projection TVs or as a video monitor for a computer system nowadays. They have become an essential part of a modern lap-top or notebook computer because of their compact size and light weight as compared to conventional display devices using cathode ray tubes. How to achieve a wider viewing angle and lower color dispersion for a liquid crystal display has been an important area that most manufacturers dedicate significant effort to.

Conventional LCD devices have a known problem related to color difference. When a liquid crystal cell of an LCD is applied a voltage, its electro-optical (E-O) characteristic is different with respect to the different optical wavelengths of red, blue and green lights. The color dispersion or birefringence dispersion caused by the difference in the electro-optical characteristic results in color difference in the LCD. For a twisted nematic (TN) mode LCD, the color difference has not been a very disturbing problem.

In recent years, the electrically controlled birefringence (ECB) effect is increasingly used in many LCD devices for obtaining a wide viewing angle. These types of liquid crystal cells include optically compensated bend (OCB) liquid crystal, closed-cavity liquid crystal (CCLC), vertically alignment (VA) mode liquid crystal, and many others. The color dispersion in these LCD devices can be very pronounced because the transimittance T of the liquid crystal is described as $$T = \sin^2[d\, \Delta n_{\text{eff}}(V)/\lambda],$$

where d is the thickness of the liquid crystal and $\Delta n_{\text{eff}}$ is the effective difference in the refractive index, V is the applied electrical voltage, and $\lambda$ is the wavelength. As $\lambda$ decreases, $\Delta n_{\text{eff}}$ increases. Therefore, the red, green, and blue colors are unbalanced. FIG. 1 shows typical transmission curves as a function of an applied voltage for different wavelengths. The color dispersion becomes a significant drawback for the LCD.

Seiichi Nagata et al. of Matsushita Electric Industrial Co., Ltd, of Japan presented a Twisted-Nematic Liquid Crystal Full-Color Display Panel with Reduced Rotatory Dispersion" in SID 85 DIGEST, for overcoming the drawback of LCD color dispersion by means of multiple cell gaps. The technique of Seiichi Nagata et al. requires an extra process in manufacturing the color filter. It also has a poor cell gap uniformity.

T. Konno et al. of Tohoku University of Japan presented a paper titled OCB-cell Using Polymer Stabilized Bend Alignment" in ASIA DISPLAY '95 for improving the switching speed from a splay alignment to a bend alignment of the liquid crystal cell when the display is turned on. The technique of T. Konno et al. induces an extended polymer network in the direction of liquid crystal alignment in order to stabilize and maintain the bend alignment of the liquid crystal even after the applied voltage is turned off. The approach presents a solution to achieve fast response for an OCB-mode LCD. However, the color dispersion issue has not been addressed.

SUMMARY OF THE INVENTION

The present invention has been made to reduce the color dispersion of an LCD which relies on ECB effects. The primary object of this invention is to provide an LCD device having polymer backbones in its liquid crystal cell for reducing color difference with respect to red, green and blue light for a wider viewing angle and a better display quality. Another object of this invention is to present methods of forming the polymer backbones for an LCD device.

According to this invention, a UV-curable monomer is added into the LC mixture of an LCD device. By applying different voltages to red, green and blue (RGB) sub-pixels of the LCD device and exposing the device under UV light, extended polymer networks are formed for RGB colors respectively with different polymer structures. The polymer networks can be controlled by applying appropriate voltages to RGB sub-pixels so that the electro-optical characteristic of the LCD with respect to different wavelengths is balanced. The color dispersion is therefore reduced.

The different polymer networks of this invention can be formed in three different UV light exposures each having its own mask for exposing the red, green or blue sub-pixel area respectively. The voltage applied during each exposure is selected so that the color difference can be minimized by the polymer networks formed for the red, green and blue sub-pixel areas after the UV light curing process. The polymer networks can also be formed in one UV light exposure while applying three different voltages to bias the red, green and blue sub-pixel areas differently.

In accordance with this invention, the difference in the phase retardation introduced by the liquid crystal for different colors are reduced. The LCD device disclosed in this invention provides both fast switching response and low color dispersion.

BRIEF DESCRIPTION OF THE DRAWINGS

FIG. 3 shows a few examples of the transmittance to voltage curves of LCDs in which a monomer is added in the liquid crystal and cured by a UV light.

FIG. 8 shows a first layout of the thin-film transistors of a TFT LCD in which the sources of the transistors are connected together for applying an identical voltage to the sources simultaneously.

DETAILED DESCRIPTION OF THE PREFERRED EMBODIMENTS

Figure 1:
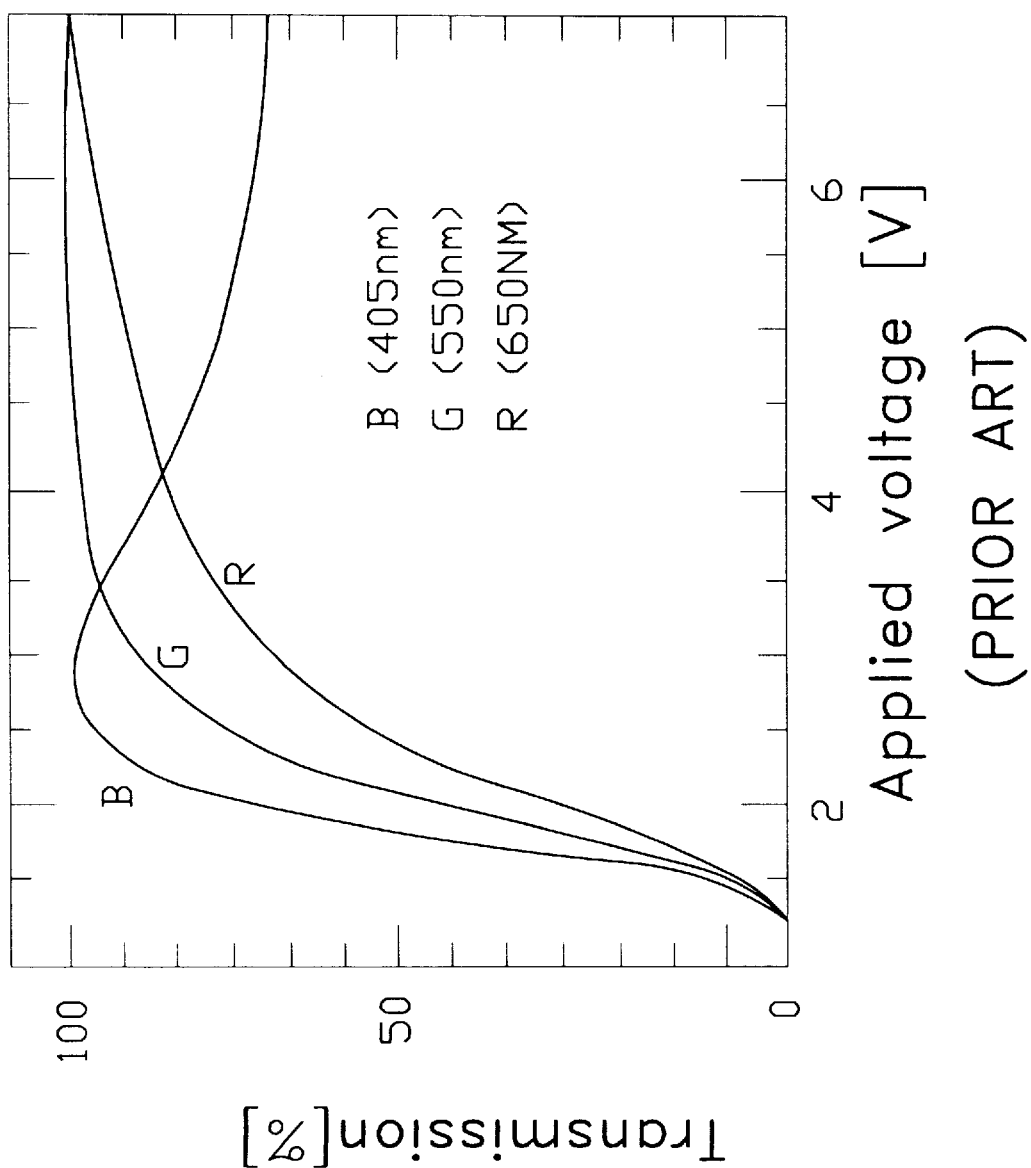
FIG. 1 shows typical transmission curves for an LCD device as a function of an applied voltage for different wavelengths.
Figure 2A:
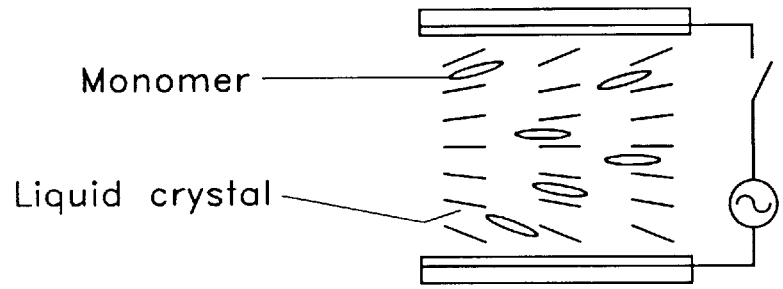
FIG. 2 shows the principle of forming a polymer network in an LCD containing an monomer additive by applying an initializing voltage and exposing the LCD under UV light.
Figure 2B:
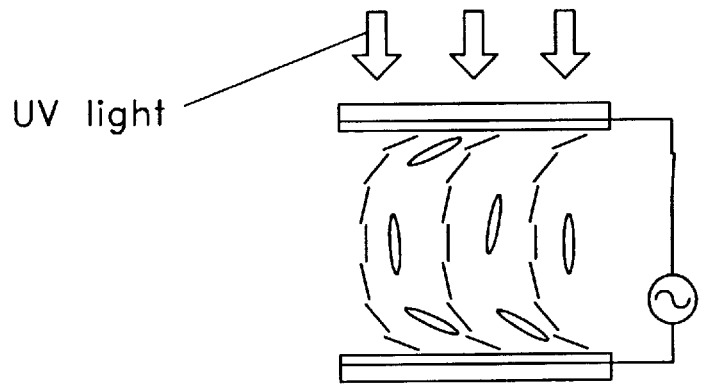
Figure 2C:
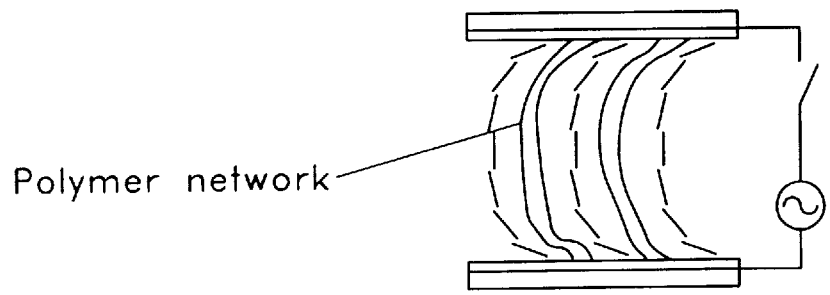

With reference to FIG. 2, it has been known that polymerization from a nematic phase mixture composed of UV-curable monomer and liquid crystal by irradiation with UV light induces an extended polymer network in the direction of liquid crystal alignment FIG. 2(a) shows a splay alignment of liquid crystal in an LCD cell. An initializing voltage transforms the splay alignment into a bend alignment as shown in FIG. 2(b). If the LCD cell is then exposed to UV light under this alignment, an extended polymer network can be established along the bend alignment. The bend alignment is therefore stabilized by the polymer backbone formed by the polymer network and the alignment remains even after the initializing voltage is turned off as shown in FIG. 2(c).

The polymer backbone changes the electro-optical characteristic of an LCD cell. It is found that the voltage-luminance characteristic of such an LCD cell depends on the initializing voltage. FIG. 3 shows a few examples of the transmittance to voltage curves of LCD cells which have an monomer additive and are cured by UV light As can be seen, the electro-optical characteristic can be modified significantly by applying different initializing (curing) voltage. In other words, the polymer networks formed in the LCD cell by applying different bias voltages during the UV exposure result in different backbone structures.

According to this invention, the E-O characteristic of red, green and blue (RGB) sub-pixels are adjusted based on the principle just described. By adding a UV-curable monomer into the LC mixture, different polymer networks for RGB sub-pixels are cured by UV light under different voltages. By properly selecting the curing voltages, the E-O characteristic with respect to RGB light can be made similar to reduce the color difference of the LCD. In other words, the phase retardation introduced by the liquid crystal is identical for red, green and blue colors. Therefore, the LCD device provided by this invention has not only fast initial response but also low color dispersion.

FIG. 4 shows a first embodiment of this invention for forming the RGB polymer networks of an LCD. An LCD device comprises a pair of substrates having transparent electrodes or switching devices for RGB, arranged to face each other with a space in which a liquid crystal material is filled. In accordance with this embodiment, a monomer is added into the LC mixture. The LCD device is exposed under UV light for curing the RGB polymer networks in three different steps. Three different masks are used in forming the polymer networks for the LCD device.

Figure 4A:
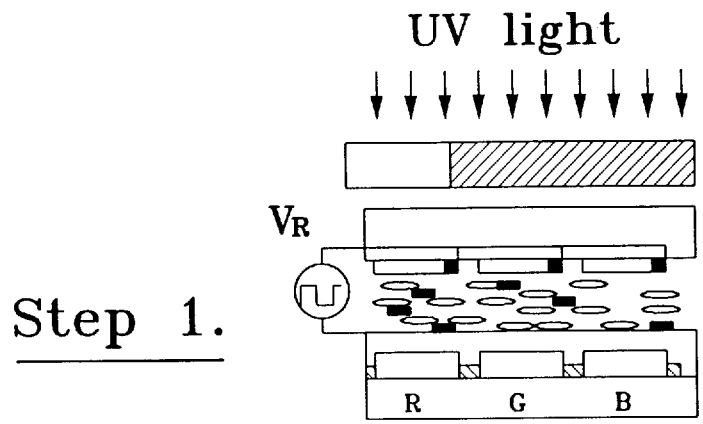
FIG. 4 shows a first embodiment of this invention that forms polymer networks of an LCD in three steps having three different bias voltages and three masks for exposing red, green and blue sub-pixel areas respectively.
Figure 4B:
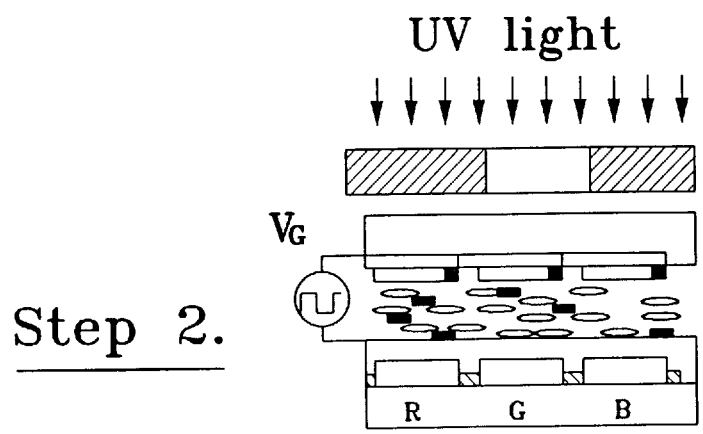
Figure 4C:
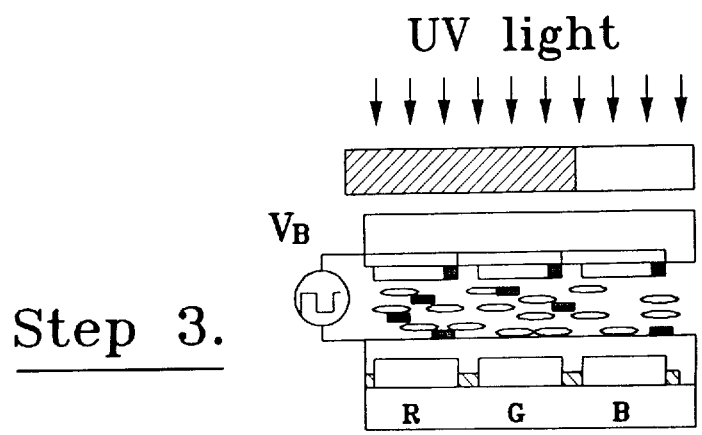

In the first step as shown in FIG. 4(a), a first bias voltage is applied to all RGB electrodes or switching devices. The first voltage is selected to form an appropriate polymer network that provides a desired E-O characteristic for red color after being cured by a UV light. A first mask that only exposes the liquid crystal cell below the red electrode or switching device is used. The LCD device is then exposed under the UV light Similarly, in the second step a second voltage is selected and applied to all RGB electrodes or switching devices to form a polymer network that provides an E-O characteristic for green color after being cured by the UV light. A second mask that only exposes the liquid crystal cell below the green electrode or switching device is used in the second step of UV exposure. FIG. 4(b) illustrates the second step. In the third step, a third voltage is selected and applied to all RGB electrodes or switching devices. A third mask that only exposes the liquid crystal cell below the blue electrode or switching device is used as shown in FIG. 4(c).

In order ot make the LCD device have similar E-O characteristic with respect to red, green and blue light so as to reduce color dispersion, the first, second and third voltages are properly selected when the three polymer networks are formed. The first bias voltage in a range between 0 to 2.5 volts is applied to all RGB electrodes while the polymer network providing the desired E-O characteristic for red color is formed and cured by a UV light. Similarly, the second voltage in a range between 1.0 to 3.5 volts is applied while the polymer network providing the desired E-O characteristic for green color is cured and formed. The third voltage in a range between 1.5 to 4.5 volts is applied while forming the polymer network for blue color.

A polymer network as described in the present invention can be cured under the UV light in a time period ranging from 20 to 200 seconds. A typical time period used in this invention is approximately 120 seconds. As discussed earlier, a well balanced E-O characteristic with respect to red, green and blue light can greatly reduce the color dispersion for the LCD display. The first, second and third voltages in a preferred embodiment of the invention are 1.8 volts, 2.4 volts and 3.0 volts respectively. By having these biased voltages and curing the polymer networks with the pre-set time period, the LCD display of the invention have shown to achieve low color dispersion.

Figure 5A:
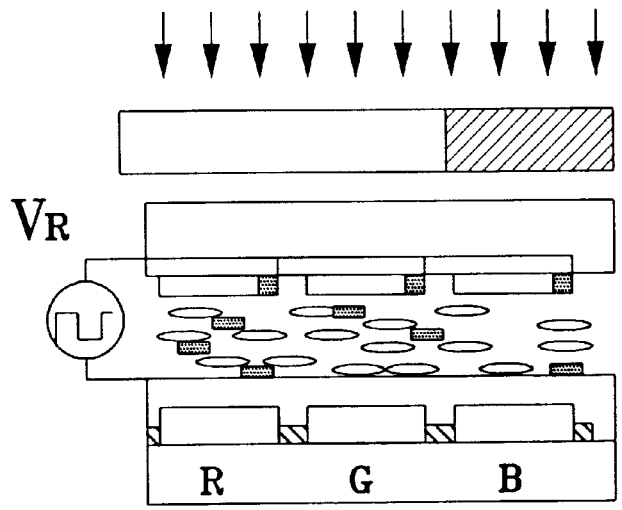
FIG. 5 shows a second embodiment of this invention that forms polymer networks of an LCD in two steps having two different bias voltages and two masks for blocking or exposing the blue sub-pixel area respectively.
Figure 5B:
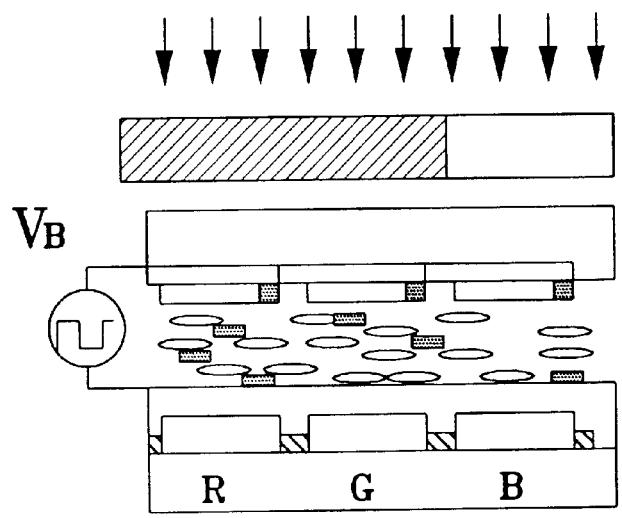

It should be noted that the first, second and third voltages are selected to form three polymer networks of different structures so that the E-O characteristic with respect to red, green and blue light is substantially balanced to reduce the color dispersion. According to the E-O characteristic of an LCD device manufactured by the method of this invention, the red and green colors have relatively small color difference even if their corresponding polymer networks are formed identically in the LC cells. Therefore, a mask that exposed the liquid crystal cells below red and green electrodes or switching devices can be used to form polymer networks for red and green colors simultaneously while a voltage is applied to all the electrodes or switching devices. FIG. 5 illustrates an embodiment in which only two steps of UV exposure are performed. The first step uses a mask that blocks the blue sub-pixel area as shown in FIG. 5(a) to form a polymer network for providing a desired E-O characteristic for both red and green light. The second step as shown in FIG. 5(b) uses a mask that exposes only the blue sub-pixel area. The bias voltages applied in the two steps are selected differently to ensure that red, green and blue colors are balanced for the LCD device. For example, the first voltage in a range of 1.0 to 2.5 volts and the second voltage in a range of 1.5 to 4.5 volts can be used for the embodiment shown in FIGS. 5(a) and 5(b) respectively.

Figure 6:
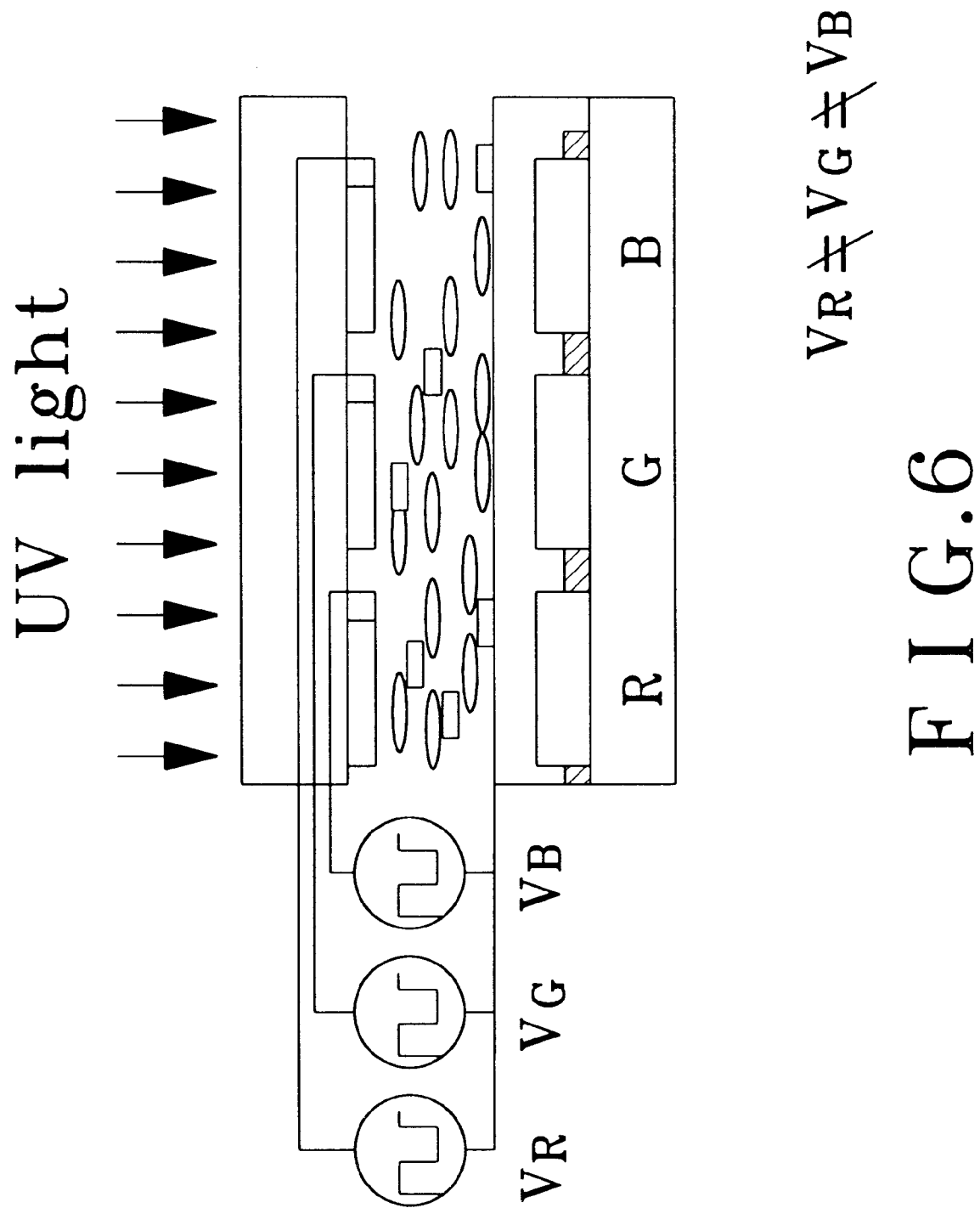
FIG. 6 shows a third embodiment of this invention that forms polymer networks of an LCD in one UV light exposure by applying three different bias voltages to red, green and blue sub-pixel areas respectively.

The embodiments described above require that either two or three different masks are used during the UV light exposure. It is also possible to cure the polymer networks without using masks. FIG. 6 shows an embodiment in which three different voltages are applied to red, green and blue electrodes or switching devices respectively at the same time while the LCD device is exposed under UV light without using a mask. Because the three voltages have been pre-determined properly, they resulted in different polymer networks formed in the liquid crystal cells below red, green and blue electrodes or switching devices. The E-O characteristic can, therefore, be controlled to provide minimum color dispersion.

Figure 7:
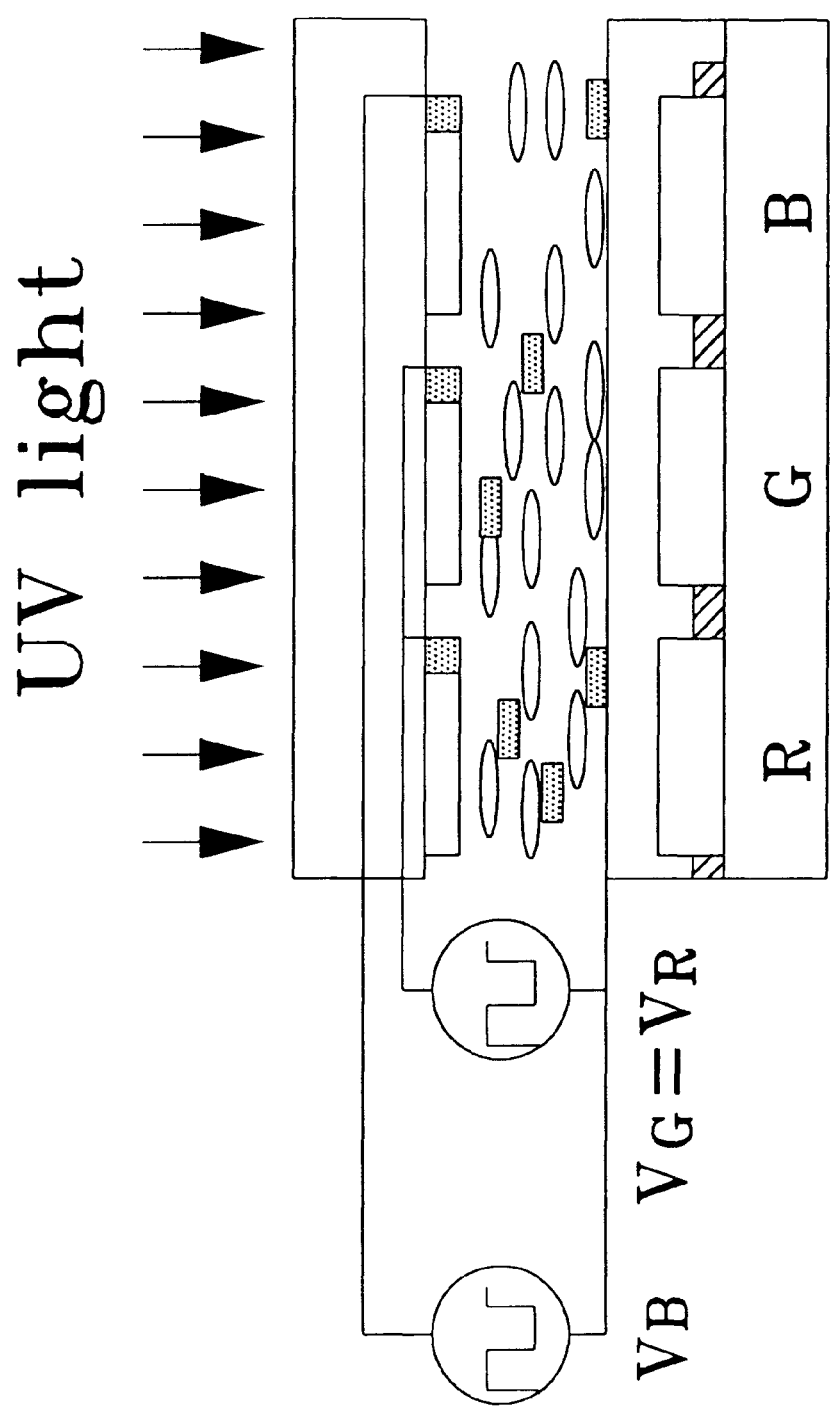
FIG. 7 shows a fourth embodiment of this invention that forms polymer networks of an LCD in one UV light exposure by applying one voltage to red and green sub-pixel areas and the other voltage to the blue sub-pixel area.

As pointed out earlier, the red and green colors have relatively small color difference even if their corresponding polymer networks are formed identically in the LC cells. It is also feasible to apply identical voltages to both red and green electrodes or switching devices while the LCD device is exposed to UV light. FIG. 7 shows an embodiment similar to that of FIG. 6 except that the voltages applied to red and green electrodes or switching devices are made identical.

In order to facilitate the application of either identical or different voltages to the electrodes or switching devices, the LCD cells have to be laid out properly during the manufacturing of the LCD device. FIG. 8 shows a first layout of a thin film transistor (TFT) LCD in which the sources of the switching transistors for red, green and blue sub-pixels are connected together so that identical voltages can be applied at the same time. The layout can be used in the embodiments of FIGS. 4 and 5 because an identical voltage is always applied at a given time in these two embodiments.

Figure 9:
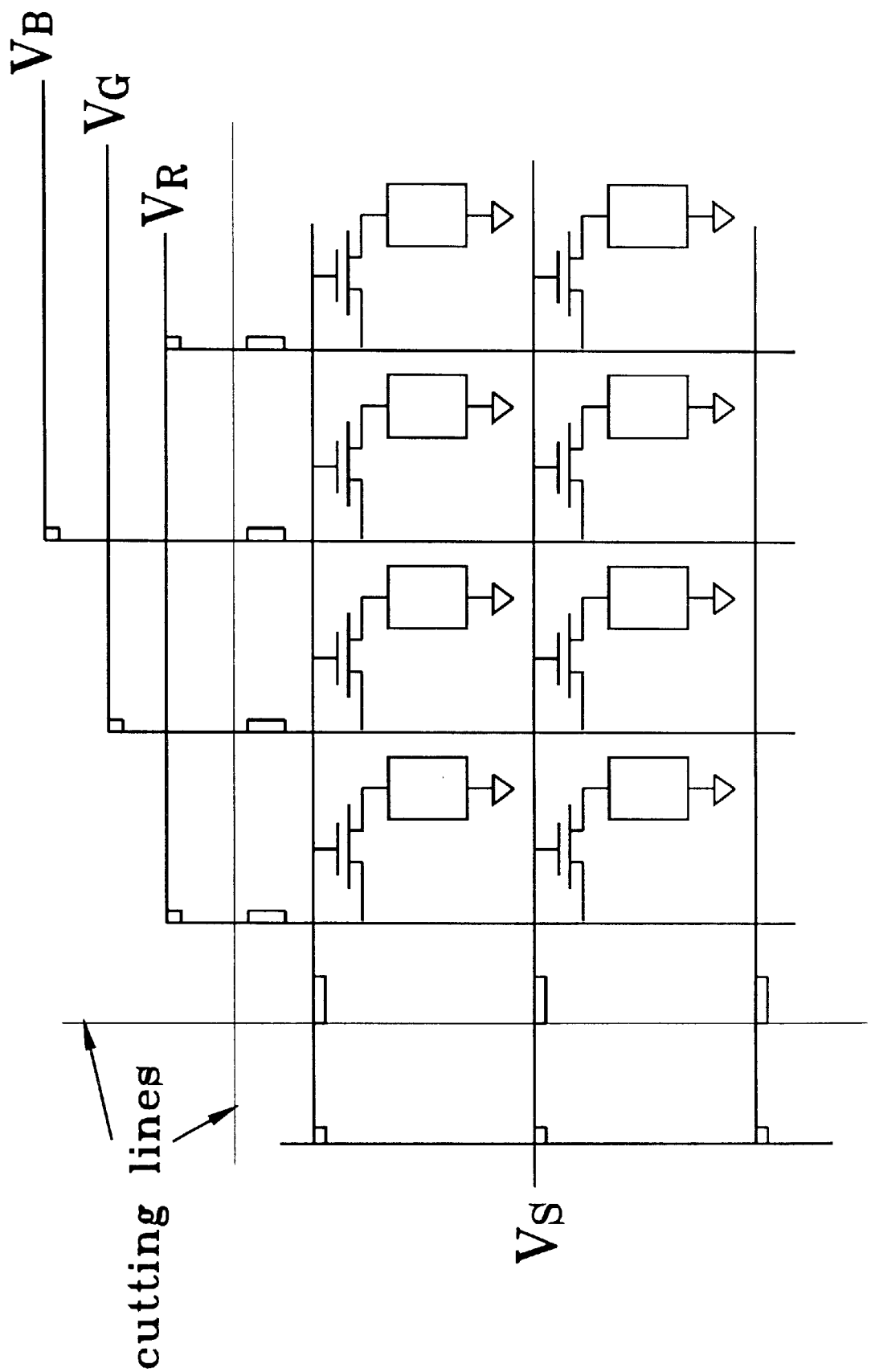
FIG. 9 shows a second layout of the thin-film transistors of a TFT LCD in which the sources of the transistors are separated for applying three different voltages to the sources of red, green and blue sub-pixels respectively at the same time.
Figure 10:
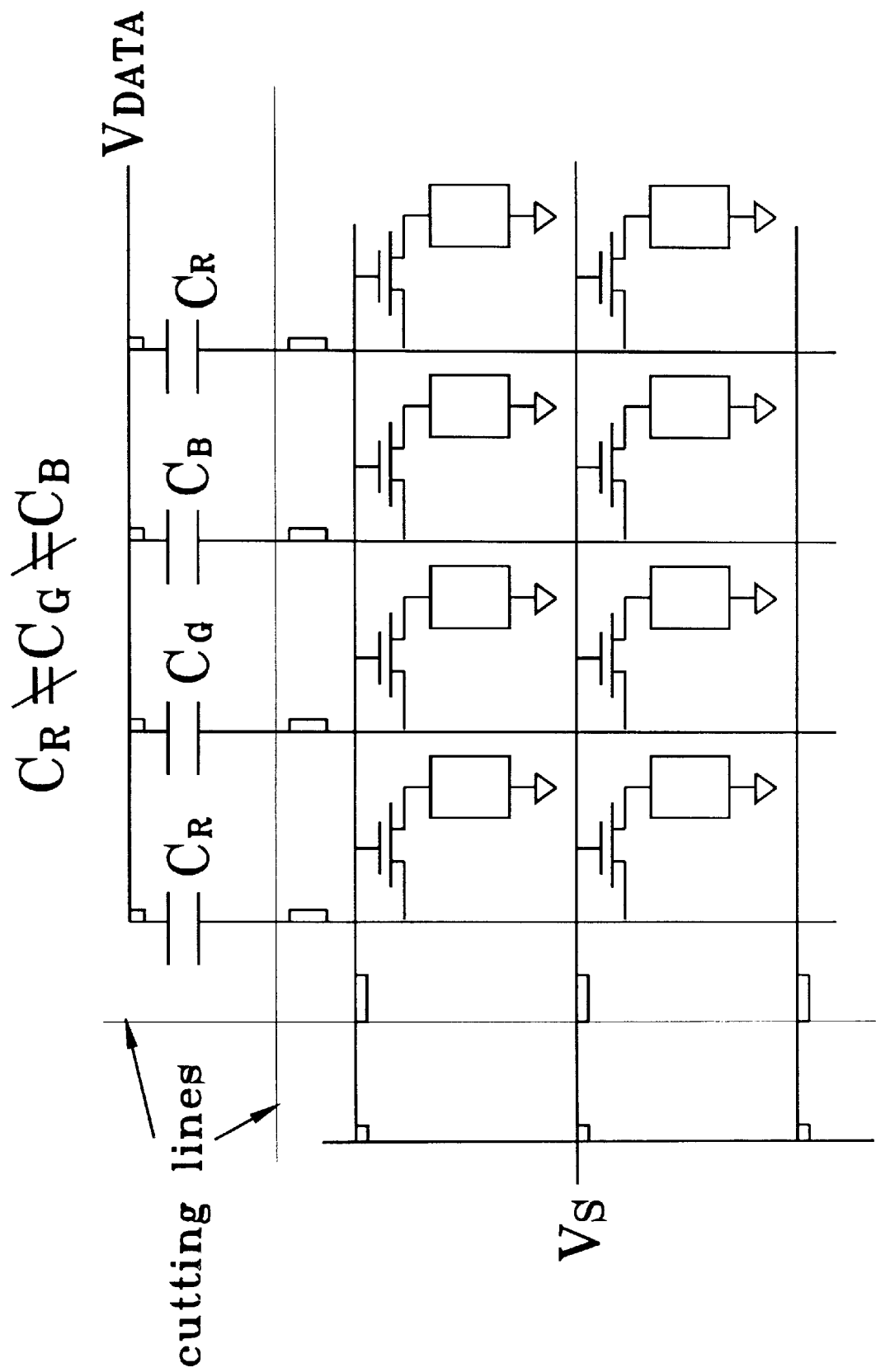
FIG. 10 shows a third layout of the thin-film transistors of a TFT LCD in which the sources of the transistors are connected to a same voltage line through three different capacitors for applying three different voltages to the sources of red, green and blue sub-pixels respectively at the same time.

FIG. 9 shows a second layout in which the sources of the switching transistors are not connected together so that different voltages can be applied simultaneously. This layout can be used in the embodiments of FIGS. 6 and 7 which require more than two different voltages to be applied at the same time to the sources of the switching transistors. FIG. 10 shows another layout in which a single voltage line is connected to the sources of the switching transistors of red, green and blue sub-pixels though three different capacitors respectively. By properly selecting the capacitance values for the capacitors, different voltages can be applied at the same time to the sources of the switching transistors. This layout can also be used for the embodiments of FIGS. 6 and 7.

In addition to adding a monomer, a photo-initiator is also added to the liquid crystal to form a liquid crystal mixture for fabricating the LCD device of this invention. Photo-initiators such as Hydroquinone and AIBN can be used. The photo-initiator speeds up the curing process of the polymer network. The concentration of the monomer is approximately 0.1 to 5% in weight with respect to the liquid crystal. The concentration of the photo-initiator is about 0.1 to 10% in weight with respect to the monomer.

Both a diacrylate monomer and a monoacrylate monomer can be used as the monomer added to the liquid crystal mixture of this invention. Examples of diacrylate monomers are

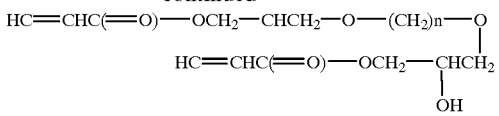

where R = H or CH$_3$, Ar = C$_6$H$_4$ and n + m = 4; and

-continued

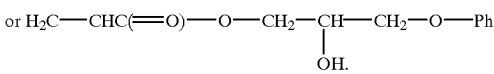

where n = 4 to 8.

An example of a monoacrylate monomer is 2-Hydroxy-3-phenoxy-propyl acrylate

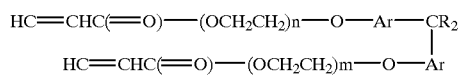

What is claimed is:

1. A method of fabricating polymer networks for an LCD device having a plurality of pixels formed by a pair of substrates facing each other with a space in which a liquid crystal material is filled, each of said plurality of pixels including red, green and blue sub-pixels, comprising the steps of:

mixing a monomer and a photo-initiator into said liquid crystal material;

forming a first polymer network within said space by applying a first bias voltage to said plurality of pixels while using a first mask for exposing said red sub-pixels under a UV light for a pre-determined period of time;

forming a second polymer network within said space by applying a second bias voltage to said plurality of pixels while using a second mask for exposing said green sub-pixels under a UV light for a pre-determined period of time; and forming a third polymer network within said space by applying a third bias voltage to said plurality of pixels while using a third mask for exposing said blue sub-pixels under a UV light for a pre-determined period of time;

wherein said first, second and third bias voltages are selected for forming said first, second and third polymer networks with different structures for minimizing the difference in phase retardation introduced by said liquid crystal material with respect to red, green and blue light for reducing the color dispersion of said liquid crystal display device.

2. The method of fabricating polymer networks for an LCD device according to claim 1, wherein said first bias voltage is in a range from 0 to 2.5 volts, said second bias voltage is in a range from 1.0 to 3.5 volts, and said third bias voltage is in a range from 1.5 to 4.5 volts.

3. The method of fabricating polymer networks for an LCD device according to claim 1, wherein the concentration of said monomer in said liquid crystal material is approximately in the range of 0.1 to 5% in weight.

4. The method of fabricating polymer networks for an LCD device according to claim 1, wherein the concentration of said photo-initiator as compared to said monomer is in the range of 0.1 to 10% in weight.

5. A method of fabricating polymer networks for an LCD device having a plurality of pixels formed by a pair of substrates facing each other with a space in which a liquid crystal material is filled, each of said plurality of pixels including red, green and blue sub-pixels, comprising the steps of:

mixing a monomer and a photo-initiator into said liquid crystal material;

forming a first polymer network within said space by applying a first bias voltage to said plurality of pixels while using a first mask for exposing said red and green sub-pixels under a UV light for a pre-determined period of time; and forming a second polymer network within said space by applying a second bias voltage to said plurality of pixels while using a second mask for exposing said blue sub-pixels under a UV light for a pre-determined period of time;

wherein said first and second bias voltages are selected for forming said first and second polymer networks with different structures for minimizing the difference in phase retardation introduced by said liquid crystal material with respect to red, green and blue light for reducing the color dispersion of said liquid crystal display device.

6. The method of fabricating polymer networks for an LCD device according to claim 5, wherein said first bias voltage is in a range from 1.0 to 2.5 volts and said second bias voltage is in a range from 1.5 to 4.5 volts.

7. The method of fabricating polymer networks for an LCD device according to claim 5, wherein the concentration of said monomer in said liquid crystal material is approximately in the range of 0.1 to 5% in weight.

8. The method of fabricating polymer networks for an LCD device according to claim 5, wherein the concentration of said photo-initiator as compared to said monomer is in the range of 0.1 to 10% in weight.

9. A method of fabricating polymer networks for an LCD device having a plurality of pixels formed by a pair of substrates facing each other with a space in which a liquid crystal material is filled, each of said plurality of pixels including red, green and blue sub-pixels, comprising the steps of:

mixing a monomer and a photo-initiator into said liquid crystal material;

applying a first bias voltage to said red sub-pixels, a second bias voltage to said green sub-pixels, a third bias voltage to said blue sub-pixels; and exposing said LCD device under a UV light for a pre-determined period of time for forming first, second and third polymer networks within said space, said first, second and third polymer networks having different structures resulted from different bias voltages;

wherein said first, second and third bias voltages are selected for forming said first, second and third polymer networks with different structures for minimizing the difference in phase retardation introduced by said liquid crystal material with respect to red, green and blue light for reducing the color dispersion of said liquid crystal display device.

10. The method of fabricating polymer networks for an LCD device according to claim 9, wherein said first bias voltage is in a range from 0 to 2.5 volts, said second bias voltage is in a range from 1.0 to 3.5 volts, and said third bias voltage is in a range from 1.5 to 4.5 volts.

11. The method of fabricating polymer networks for an LCD device according to claim 9, wherein the concentration of said monomer in said liquid crystal material is approximately in the range of 0.1 to 5% in weight.

12. The method of fabricating polymer networks for an LCD device according to claim 9, wherein the concentration of said photo-initiator as compared to said monomer is in the range of 0.1 to 10% in weight.

13. The method of fabricating polymer networks for an LCD device according to claim 9, wherein said first and second bias voltages are identical.

\* \* \* \* \*